(12) United States Patent
Jeon

(10) Patent No.: US 9,309,997 B2
(45) Date of Patent: Apr. 12, 2016

(54) PIPE MADE OF SYNTHETIC RESIN HAVING A PLURALITY OF INTERNAL TUBES

(76) Inventor: Jeong Ja Jeon, Seoul (KR)

( * ) Notice: Subject to any disclaimer, the term of this patent is extended or adjusted under 35 U.S.C. 154(b) by 48 days.

(21) Appl. No.: 13/639,673

(22) PCT Filed: Feb. 23, 2011

(86) PCT No.: PCT/KR2011/001226
§ 371 (c)(1),
(2), (4) Date: Oct. 19, 2012

(87) PCT Pub. No.: WO2011/126213
PCT Pub. Date: Oct. 13, 2011

(65) Prior Publication Data
US 2013/0199654 A1    Aug. 8, 2013

(30) Foreign Application Priority Data

Apr. 6, 2010    (KR) .......................... 10 2010 031572

(51) Int. Cl.
*F16L 9/18*    (2006.01)
*F16L 9/19*    (2006.01)
(Continued)

(52) U.S. Cl.
CPC ................. *F16L 9/19* (2013.01); *B29D 23/001* (2013.01); *F16L 11/22* (2013.01); *G02B 6/4459* (2013.01); *G02B 6/4494* (2013.01)

(58) Field of Classification Search
CPC .......... F16L 9/19; F16L 11/22; B29D 23/001; G02B 6/4459; G02B 6/4494
USPC ......... 138/108, 111, 112, 113, 115, 116, 117, 138/156, 170, 173; 156/294; 174/95, 96
See application file for complete search history.

(56) References Cited

U.S. PATENT DOCUMENTS 682,434 A * 9/1901 Sullivan ......................... 138/111
2,097,600 A * 11/1937 Pavlecka ....................... 138/115
(Continued)

FOREIGN PATENT DOCUMENTS

| JP | 2008-241082 A | 10/2008 |
|---|---|---|
| KR | 10-2000-0031630 A | 6/2000 |

(Continued)

OTHER PUBLICATIONS

English Translation of Jeon, KR 10-0920476 B1, Aug. 2014.*

*Primary Examiner* — J. Casimer Jacyna
*Assistant Examiner* — Benjamin R Shaw
(74) *Attorney, Agent, or Firm* — Rabin & Berdo, P.C.

(57) ABSTRACT

The present invention relates to a pipe made of synthetic resin having a plurality of internal tubes, wherein silicone coating layers are formed on the respective inner circumferential surfaces of the plurality of internal tubes which are accommodated in an external tube, such that long optical fibers or electrical wires or the like inserted in the same can be readily and easily accommodated while water repellency is maintained, and failure to fuse or deformation of any of the side surfaces of the internal tubes, which are fused to the inner circumferential surface of the external tube, can be prevented when the internal tubes are formed integrally on the external tube, and the plurality of internal tubes can be stably inserted into and joined by fusing onto the inner circumferential surface of the external tube, and deformation due to temperature differences between the external tube and the internal tubes during cooling can be prevented while the internal tubes are inserted into and joined by fusing onto the inner circumferential surface of the external tube in a hermetic state.

6 Claims, 6 Drawing Sheets

(51) Int. Cl.
*F16L 11/22* (2006.01)
*G02B 6/44* (2006.01)
*B29D 23/00* (2006.01)

(56) References Cited

U.S. PATENT DOCUMENTS

| | | | | |
|---|---|---|---|---|
| 3,113,595 | A * | 12/1963 | Cotman, Jr. | 138/113 |
| 3,126,918 | A * | 3/1964 | Eaton | 138/113 |
| 3,743,760 | A * | 7/1973 | Sassin | 174/15.5 |
| 4,199,009 | A * | 4/1980 | Ballone | 138/112 |
| 4,296,921 | A * | 10/1981 | Hayashi | 266/270 |
| 4,456,058 | A * | 6/1984 | Powell | 165/154 |
| 4,529,009 | A * | 7/1985 | Horner et al. | 138/111 |
| 4,709,730 | A * | 12/1987 | Zwilling | 138/111 |
| 4,741,593 | A * | 5/1988 | Fochler | 385/134 |
| 4,804,020 | A * | 2/1989 | Bartholomew | 138/111 |
| 4,975,055 | A * | 12/1990 | LaPlante | 433/82 |
| 5,924,456 | A * | 7/1999 | Simon | 138/122 |
| 6,774,311 | B1 * | 8/2004 | Byun | 174/95 |
| 7,077,165 | B2 * | 7/2006 | Takasaki et al. | 138/108 |
| 8,096,326 | B2 * | 1/2012 | Palmeri | 138/121 |
| 8,783,246 | B2 * | 7/2014 | Lu et al. | 126/676 |
| 2001/0017163 | A1 * | 8/2001 | Penza | 138/98 |
| 2005/0224124 | A1 * | 10/2005 | Grimsley et al. | 138/108 |
| 2006/0086401 | A1 * | 4/2006 | Sato | 138/140 |
| 2006/0151040 | A1 * | 7/2006 | Olsen et al. | 138/115 |
| 2008/0121410 | A1 * | 5/2008 | McCall et al. | 174/95 |
| 2008/0178956 | A1 * | 7/2008 | Willingham | 138/108 |
| 2011/0203765 | A1 * | 8/2011 | Jensen | 165/45 |
| 2012/0024411 | A1 * | 2/2012 | Hahn et al. | 138/109 |

FOREIGN PATENT DOCUMENTS

| | | |
|---|---|---|
| KR | 10-2002-0006394 A | 1/2002 |
| KR | 10-0355751 B1 | 10/2002 |
| KR | 10-2008-0088234 A | 10/2008 |
| KR | 10-0920476 B1 * | 10/2009 |

* cited by examiner

US 9,309,997 B2

PIPE MADE OF SYNTHETIC RESIN HAVING A PLURALITY OF INTERNAL TUBES

TECHNICAL FIELD

The present invention relates to a pipe made of a synthetic resin having a plurality of internal tubes in that long optical fibers or electrical wires or the like arranged in a ground network are easily accommodated in the plurality of the internal tubes having a silicon coating layer, thereby safely protecting them and each internal tube is connected to each other through elastic connecting parts, so that the internal tubes can be easily accommodated in and fused to an external tube to be fixed. More particularly, the present invention relates to a pipe made of a synthetic resin having a plurality of internal tubes in that the pipe made of the synthetic resin includes a silicon coating layer stacked and formed on an inner circumference of each synthetic resin internal tube, which are accommodated in the external tube, to a predetermined thickness and an elastic connecting part of a predetermined thickness integrally and radially connected to a lower end of each internal tube from a center part of the external tube so as to elastically support and fix each internal tube thereto; each internal tube fixed to the elastic connecting parts is separated from each other in the inner circumference of the synthetic external tube at a predetermined interval and integrally fused and coupled to the inner circumferential surface of the external tube; a silicon coating layer is stacked and formed on the inner circumference of each synthetic resin internal tube, which are accommodated in the external tube, to a predetermined thickness, so that long optical fibers or electrical wires or the like inserted in the internal tube can be readily and easily accommodated therein while water repellency is maintained owing to the silicon coating layer; the elastic connecting part is integrally and radially connected to the lower end of each internal tube from the center part of the external tube, so that each internal tube is easily and elastically inserted into the synthetic resin external tube to be fused thereto; although non-fusion or a deformation of any of the side surfaces of the internal tubes fused to the inner circumferential surface of the external tube can be generated, since it is difficult to equally extrude the plurality of the internal tubes and the elastic connecting part for elastically supporting the internal tubes owing to an injection of the synthetic resin, a cooling process, or their circumstances, the elastic connecting part is slightly bent to back up the internal tube, so that the internal tube can be supported and fixed thereto, thereby the plurality of internal tubes can be stably inserted into and joined by fusing onto the inner circumferential surface of the external tube; and when the internal tubes are elastically supported by the elastic connecting part and the external tube and the internal tubes integrally fused and coupled to the inner circumference surface of the external tube are bent for laying on the curve area of the ground, the internal tubes are elastically supported by the elastic connecting part to be easily bent, each internal tube is closely fused and coupled to the inner circumference surface of the external tube, and a deformation due to temperature differences between the external tube and the internal tubes during cooling can be prevented during cooling.

BACKGROUND ART

Generally, a synthetic resin pipe is essentially established during public works such as electric and communication railroad line construction, waterway construction, or multiplex communications etc. Here, a wrinkle type pipe capable of properly expanding and contracting according to the change of ground status or the change of pressure of the conduit is widely used. A plurality of internal tubes smaller than the wrinkle type tube in diameter are built-in the wrinkle type tube and the optical cables are inserted into each internal conduits, thereby establishing the railroad line for multiple communication.

However, in the wrinkle type pipe having a plurality of internal tubes, since the internal tubes are manually assembled into the external tube of the wrinkle type pipe through separate extruding processes, the internal tubes are closely inserted into the external tube of the wrinkle type tube without an insertion space of the synthetic resin tube and the insertion length of the internal tube becomes longer. Accordingly, there are problems in that the productivity and quality thereof can be deteriorated.

In order to solve these problems, as shown in FIG. 1 and FIG. 2, Korean patent registration No. 10-0355751 discloses "Multi channel duct assembling body for cable" capable of connecting the internal tubes 1, which are coupled to the inside of the external tube 2, to each other by using connecting bands 3 and fusing the internal tubes to the external tube.

However, in case of the multi channel duct assembling body for cable as described above, as shown in FIG. 2, since the internal tubes made of a flexible material such as a polyethylene are not connected to each other, the internal tubes are extruded to the external tube 2 in a state that the internal tubes 1 are leaned to one side or deviated from the external tube 2. Accordingly, there is a big problem in that it is turned upon one side and a deformation is generated without inserting the internal tubes 1 into the inside of the external tube 2 at a predetermined interval and in a predetermined shape.

In addition to this, although the internal tubes 1 connected to each other through the connecting bands 3 are uniformly inserted into the inside of the external tube 2 to be fused, where the pipe made of the synthetic resin having long optical fibers or electrical wires or the like is installed in the ground, there is a problem in that it is exceedingly difficult to bend the internal tubes accommodated in the external tube.

In order to solve the above defect and problem, as shown in FIG. 1 and FIG. 2, Korean patent registration No. 10-0920476 filed by the present applicant discloses a synthetic resin tube with a plurality of internal tubes in that the plurality of the internal tubes, which is located at the inside of the external tube, is connected to each other through connecting portions, whereby it can prevent the coiled internal conduits from being unfolded owing to a strength of stability thereof and the entire portion or a part of a circumference surface of each internal tube is fused to the inner circumference surface of the external tube, whereby it can prevent the internal tubes from being twisted inside the external tube.

That is, as shown in FIG. 3, the synthetic resin tube with the plurality of internal tubes includes a synthetic resin external tube 10 molded by an extruding process, the plurality of synthetic resin internal tubes 20 molded by an extruding process and located at an inside of the synthetic resin external tube; and connecting portions 30 for connecting adjacent internal tubes 20 to each other, wherein looped curves or looped squares are formed through the plurality of internal tubes and the connecting portions in section and parts of each outer circumference of the internal tubes 20 are fused on an inner circumference of the external tube 10.

Therefore, since the plurality of the internal tubes 20 located inside the external tube 10 is connected to each other through the connection part, it can prevent the internal tubes 20 from being deviated to outside in case that the external tube 10 is damaged after the construction thereof. Also, the internal and external tubes can be molded through a series of extruding processes during manufacturing thereof and separate coiling or fixing works of the inner conduits can be eliminated, whereby easily manufacturing a multiple pipe type tube.

However, in case of the synthetic resin tube having the plurality of the internal tubes 20 as described above, since the side parts of each internal tube 20 are connected to each other in the shape of the looped curve through the connecting portions 30, when the internal tubes are inserted into and fused to the external tube, the elastic force of the connecting portions 30 for connecting the internal tubes 20 becomes weak. Accordingly, during the bending of the synthetic resin tube, there is a problem in that it is bent to a large load together with the plurality of the internal tubes 20, which is accommodated in the outer tube.

DISCLOSURE

Technical Problem

Accordingly, the present invention has been made to solve the above-mentioned problems occurring in the prior art, and an object of the present invention is to provide a pipe made of a synthetic resin having a plurality of internal tubes in that the pipe made of the synthetic resin includes a silicon coating layer stacked and formed on an inner circumference of each synthetic resin internal tube, which are accommodated in the external tube, to a predetermined thickness and an elastic connecting part of a predetermined thickness integrally and radially connected to a lower end of each internal tube from a center part of the external tube so as to elastically support and fix each internal tube thereto; each internal tube fixed to the elastic connecting parts is separated from each other in the inner circumference of the synthetic external tube at a predetermined interval and integrally fused and coupled to the inner circumferential surface of the external tube; a silicon coating layer is stacked and formed on the inner circumference of each synthetic resin internal tube, which are accommodated in the external tube, to a predetermined thickness, so that long optical fibers or electrical wires or the like inserted in the internal tube can be readily and easily accommodated therein while water repellency is maintained owing to the silicon coating layer; the elastic connecting part is integrally and radially connected to the lower end of each internal tube from the center part of the external tube, so that each internal tube is easily and elastically inserted into the synthetic resin external tube to be fused thereto; although non-fusion or a deformation of any of the side surfaces of the internal tubes fused to the inner circumferential surface of the external tube can be generated, since it is difficult to equally extrude the plurality of the internal tubes and the elastic connecting part for elastically supporting the internal tubes owing to an injection of the synthetic resin, a cooling process, or their circumstances, the elastic connecting part is slightly bent to back up the internal tube, so that the internal tube can be supported and fixed thereto, thereby the plurality of internal tubes can be stably inserted into and joined by fusing onto the inner circumferential surface of the external tube; and when the internal tubes are elastically supported by the elastic connecting part and the external tube and the internal tubes integrally fused and coupled to the inner circumference surface of the external tube are bent for laying on the curve area of the ground, the internal tubes are elastically supported by the elastic connecting part to be easily bent, each internal tube is closely fused and coupled to the inner circumference surface of the external tube, and a deformation due to temperature differences between the external tube and the internal tubes during cooling can be prevented during cooling.

Technical Solution

In order to accomplish this object, there is provided a pipe made of a synthetic resin having a plurality of internal tubes comprising: a synthetic resin external tube molded by an extruding process; the plurality of the synthetic resin internal tubes inserted into an inside of the synthetic external tube and having one side joined by fusing onto an inner circumferential surface of the external tube through the extruding process; a silicon coating layer stacked and formed on the inner circumference of each synthetic resin internal tube, which are accommodated in the external tube, to a predetermined thickness; and an elastic connecting part of a predetermined thickness integrally and radially connected to a lower end of each internal tube from a center part P of the external tube so as to elastically support and fix each internal tube thereto, wherein each internal tube fixed to the elastic connecting parts is separated from each other in the inner circumference of the synthetic external tube at a predetermined interval and integrally fused and coupled to the inner circumferential surface of the external tube.

At this time, the elastic connecting parts, which are integrally and radially connected to a lower end of the internal tubes respectively, are more thinly formed than the internal tube in thickness and a thickness of the elastic connecting part is 0.6-0.8 mm.

Also, each internal tube which is accommodated in the external tube has a corrugated tube having a mountain portion and a valley portion.

Moreover, a rounding portion is formed in the mountain portion protruded to each internal tube and another silicon coating layer is formed on the rounding portion, so that the silicon coating layer is fused and coupled to the inner circumference surface of the external tube.

Advantageous Effects

According to the invention, there are effects in that the pipe made of the synthetic resin includes a silicon coating layer stacked and formed on an inner circumference of each synthetic resin internal tube, which are accommodated in the external tube, to a predetermined thickness and an elastic connecting part of a predetermined thickness integrally and radially connected to a lower end of each internal tube from a center part of the external tube so as to elastically support and fix each internal tube thereto; each internal tube fixed to the elastic connecting parts is separated from each other in the inner circumference of the synthetic external tube at a predetermined interval and integrally fused and coupled to the inner circumferential surface of the external tube; a silicon coating layer is stacked and formed on the inner circumference of each synthetic resin internal tube, which are accommodated in the external tube, to a predetermined thickness, so that long optical fibers or electrical wires or the like inserted in the internal tube can be readily and easily accommodated therein while water repellency is maintained owing to the silicon coating layer; the elastic connecting part is integrally and radially connected to the lower end of each internal tube from the center part of the external tube, so that each internal tube is easily and elastically inserted into the synthetic resin external tube to be fused thereto; although non-fusion or a deformation of any of the side surfaces of the internal tubes fused to the inner circumferential surface of the external tube can be generated, since it is difficult to equally extrude the plurality of the internal tubes and the elastic connecting part for elastically supporting the internal tubes owing to an injection of the synthetic resin, a cooling process, or their circumstances, the elastic connecting part is slightly bent to back up the internal tube, so that the internal tube can be supported and fixed thereto, thereby the plurality of internal tubes can be stably inserted into and joined by fusing onto the inner circumferential surface of the external tube; and when the internal tubes are elastically supported by the elastic connecting part and the external tube and the internal tubes integrally fused and coupled to the inner circumference surface of the external tube are bent for laying on the curve area of the ground, the internal tubes are elastically supported by the elastic connecting part to be easily bent, each internal tube is closely fused and coupled to the inner circumference surface of the external tube, and a deformation due to temperature differences between the external tube and the internal tubes during cooling can be prevented during cooling.

BRIEF DESCRIPTION OF THE DRAWINGS

The above and other objects, features and advantages of the present invention will be more apparent from the following detailed description taken in conjunction with the accompanying drawings, in which.

Figure 1:
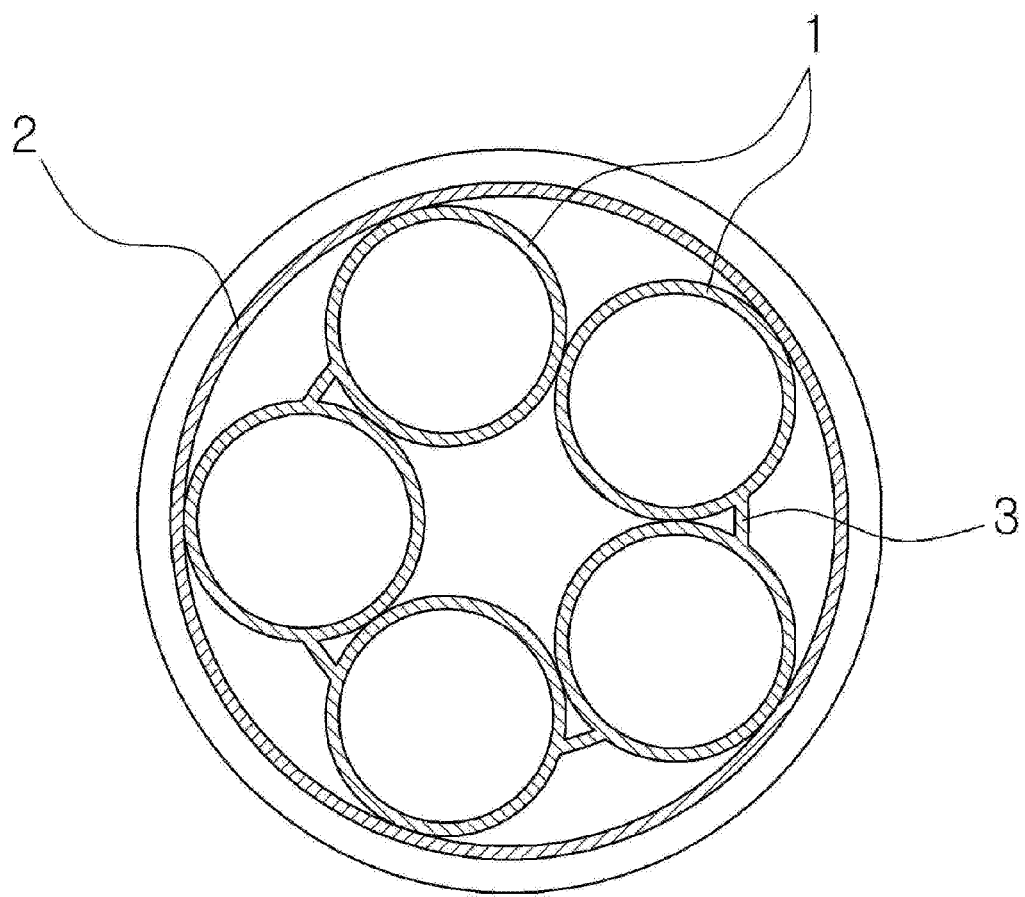
FIG. 1 is a front sectional view illustrating a conventional pipe made of a synthetic resin.
Figure 2:
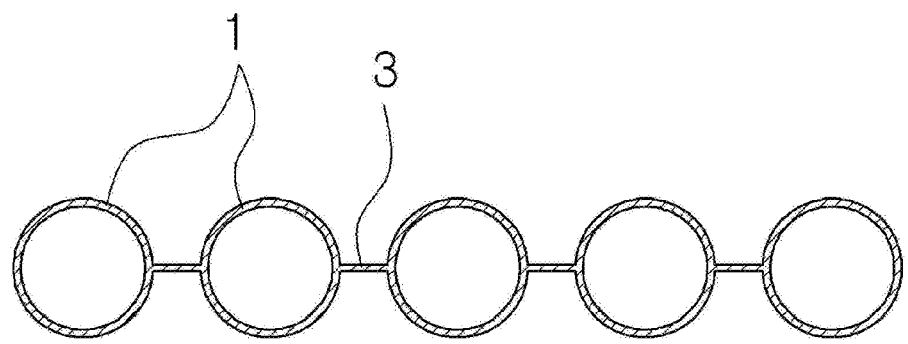
FIG. 2 is a sectional view illustrating an internal tube of the pipe made of the synthetic resin of FIG. 1.
Figure 3:
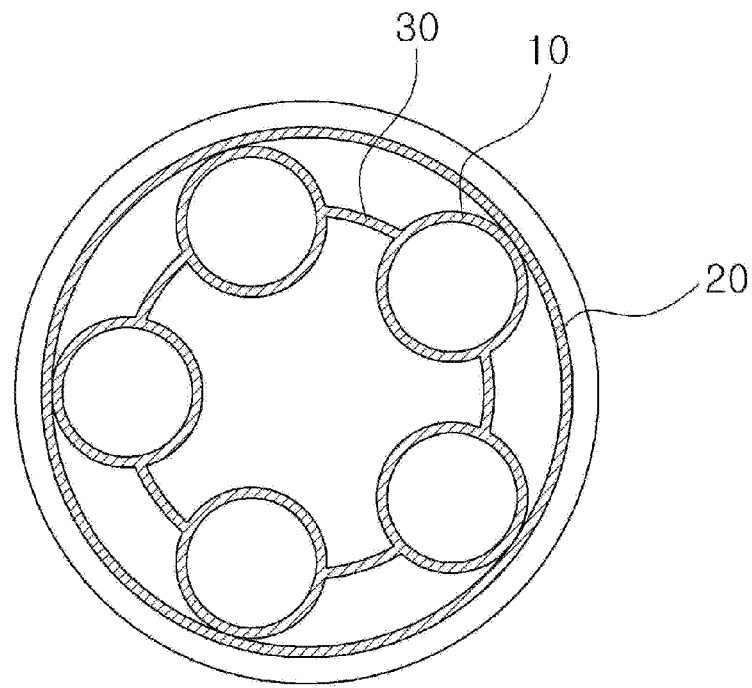
FIG. 3 is a front sectional view illustrating another conventional pipe made of a synthetic resin having a plurality of internal tubes formed inside an external tube.

<Descriptions on reference numbers for the major components in the drawings>

110: external tube
121: mountain portion
123: rounding portion
130: elastic connecting part
140, 150: silicon coating layer
P: center part 120: internal tube
122: valley portion
t: thickness

BEST MODE

Mode for Invention

Hereinafter, an exemplary embodiment of the present invention will be described in detail with reference to the accompanying drawings.

Figure 4:
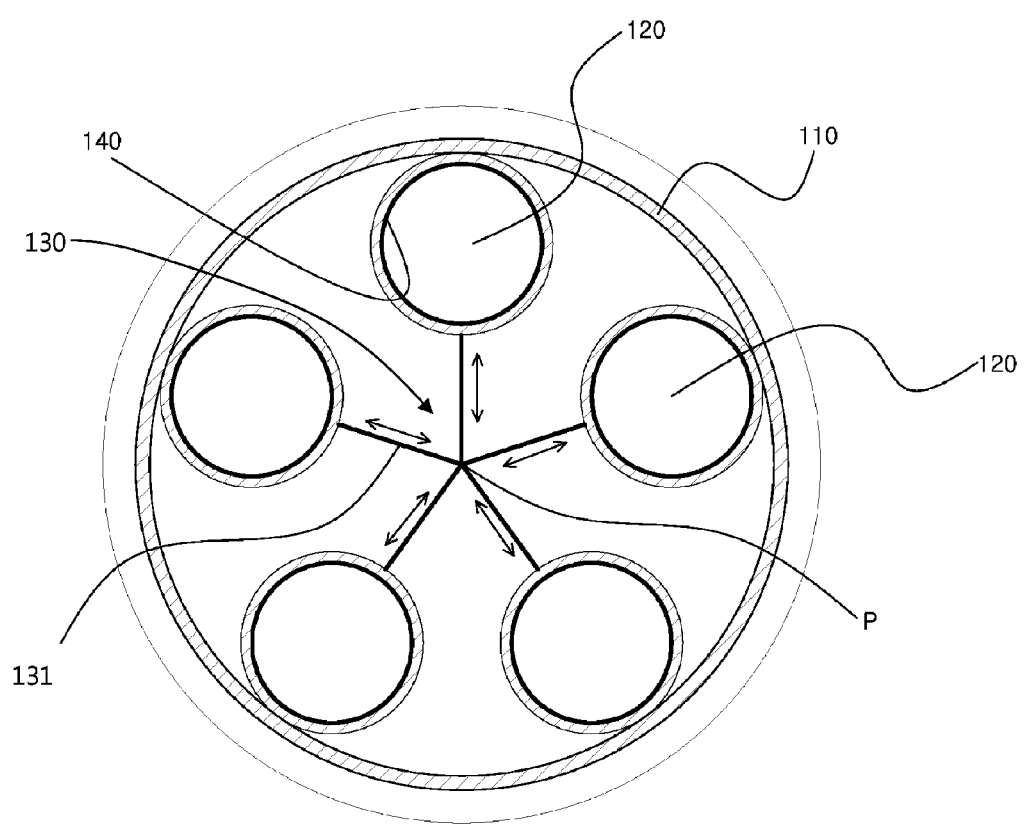
FIG. 4 is a front sectional view illustrating a pipe made of a synthetic resin having a plurality of internal tubes according to the present invention.
Figure 5:
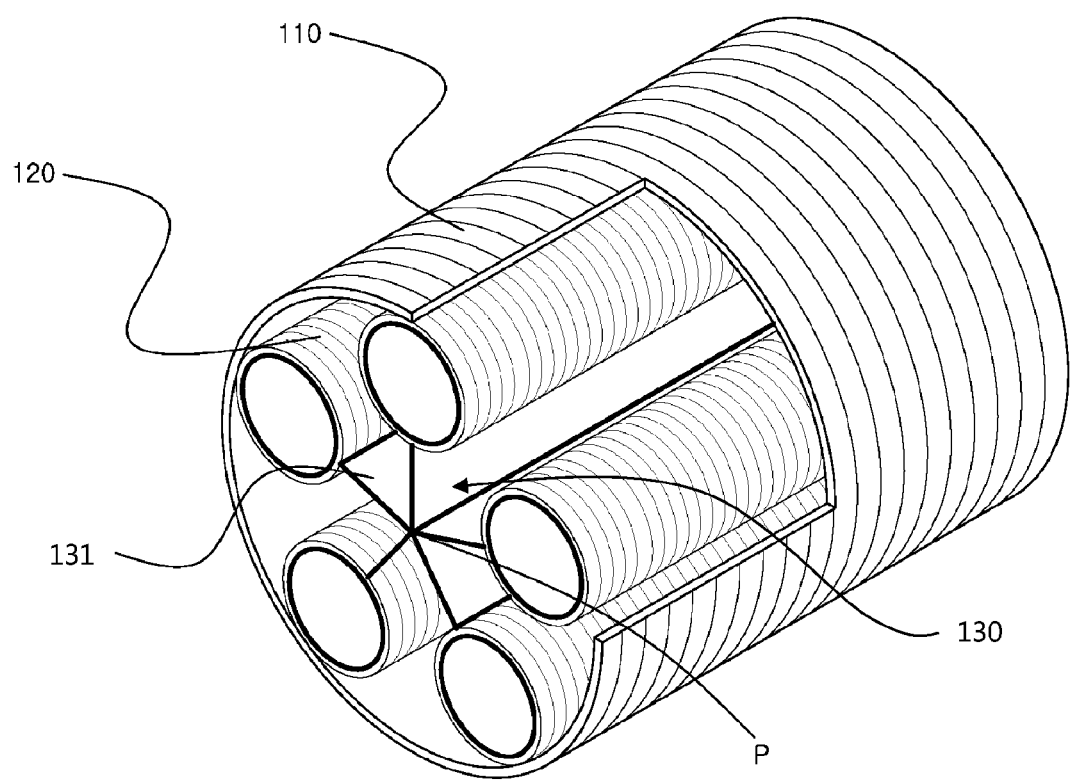
FIG. 5 is a partial prospective view illustrating a pipe made of a synthetic resin having a plurality of internal tubes according to the present invention.
Figure 6:
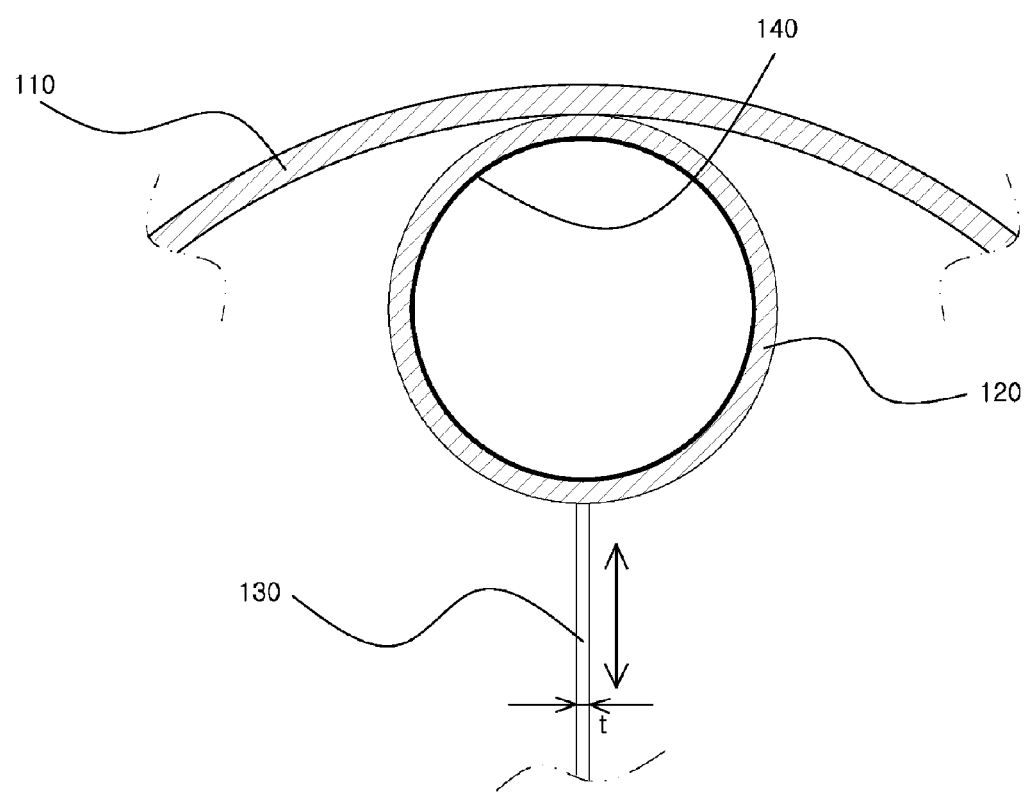
FIG. 6 is an enlarged sectional view illustrating an install status of an internal tube having one surface elastically coupled and fused to an inner circumferential surface of an external tube made of synthetic resin according to the present invention.

FIG. 4 is a front sectional view illustrating a pipe made of a synthetic resin having a plurality of internal tubes according to the present invention, FIG. 5 is a partial prospective view illustrating a pipe made of a synthetic resin having a plurality of internal tubes according to the present invention, and FIG. 6 is an enlarged sectional view illustrating an install status of an internal tube having one surface elastically coupled and fused to an inner circumferential surface of an external tube made of synthetic resin according to the present invention. The pipe made of the synthetic resin having the plurality of internal tubes 120 according to the present invention includes the synthetic resin external tube 110 molded by an extruding process and the plurality of the synthetic resin internal tubes 120 inserted into an inside of the synthetic external tube 110 and having one side joined by fusing onto an inner circumferential surface of the external tube 110 through the extruding process.

Also, the pipe made of the synthetic resin having the plurality of internal tubes 120 according to the present invention includes a silicon coating layer 140 stacked and formed on the inner circumference of each synthetic resin internal tube, which are accommodated in the external tube, to a predetermined thickness and an elastic connecting part 130 of a predetermined thickness (t) integrally and radially connected to a lower end of each internal tube 120 from a center part P of the external tube 110 so as to elastically support and fix each internal tube 120 thereto.

Moreover, each internal tube 120 fixed to the elastic connecting parts 130 is separated from each other in the inner circumference of the synthetic external tube 110 at a predetermined interval and integrally fused and coupled to the inner circumferential surface of the external tube 110.

Furthermore, the elastic connecting parts 130 include as many supporters 131 as the number of the internal tubes 120, one side of each supporter is integrally and radially connected with other winds in the center part P of the external tube, and the other side of said each supporter is fixed to an outer circumferential surface of corresponding one of the internal tubes 120 respectively. Also, each supporter has a long narrow plate shape and is more thinly formed than the internal tube 120 in thickness (t). At this time, the thickness (t) of each of the wins of the elastic connecting part 130 is 0.6~0.8 mm.

Figure 7:
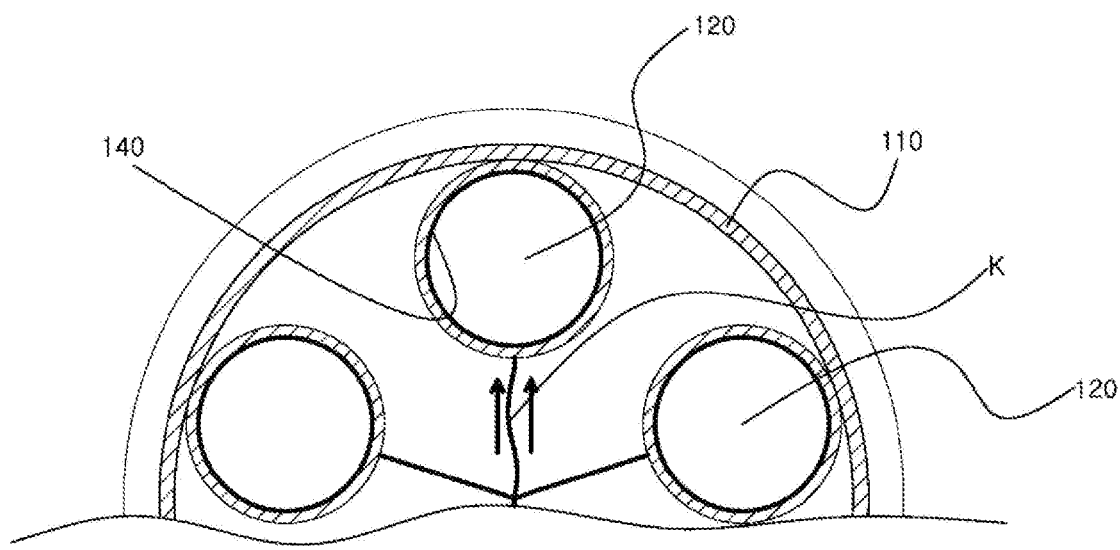
FIG. 7 is an enlarged sectional view illustrating an internal tube elastically and closely fused to an inner circumferential surface of an external tube made of synthetic resin and a state of adhering the internal tube to the inner circumferential surface of the external tube through a bending of an elastic connecting part during deforming of the elastic connecting part according to the present invention.

In addition to this, each internal tube 120, which is accommodated in the external tube 110, includes a corrugated tube having a mountain portion 121 and a valley portion 122. At this time, as shown in FIG. 7, a rounding portion 123 is formed in the mountain portion 121 protruded to each internal tube 120 and a silicon coating layer 150 is formed on the rounding portion 123, so that the silicon coating layer 150 is fused and coupled to the inner circumference surface of the external tube 110.

The operation and the effect of the present invention having the above construction will be described.

As shown in FIG. 4 through FIG. 7, in the pipe made of the synthetic resin having the plurality of internal tubes 120, the plurality of the synthetic resin internal tubes 120 is integrally extruded on the inner circumferential surface of the synthetic external tube 110 molded by the extruding process, so that one side of each internal tube 120 is inserted into the inner circumferential surface of the external tube 120 to be integrally fused and coupled thereto.

At this time, the silicon coating layer 140 is stacked and formed on the inner circumference of each synthetic resin internal tube, which are accommodated in the external tube, to a predetermined thickness, so that long optical fibers or electrical wires or the like inserted in the internal tube 120 can be readily and easily accommodated therein while water repellency is maintained owing to the silicon coating layer 140.

Also, in the synthetic resin internal tubes 120 fused and coupled to the inner circumferential surface of the synthetic external tube, as shown in FIG. 4 through FIG. 6, the elastic connecting part 130 of a predetermined thickness (t) is integrally and radially connected to the lower end of each internal tube 120 from the center part P of the external tube 110 so as to elastically support and fix each internal tube 120 thereto, so that each internal tube 12 is easily and elastically inserted into the synthetic resin external tube 110 through the elastic connecting part 130 and one side surface of each internal tube 120 is fused and coupled to the external tube.

In addition to this, as shown in FIG. 7, when the internal tubes 120 are integrally formed on the external tube 110, since it is difficult to equally extrude the plurality of the internal tubes 120 and the elastic connecting part 130 for elastically supporting the internal tubes 120 owing to the injection of the synthetic resin, the cooling process, or their circumstances, a non-fusion or a deformation of any of the side surfaces of the internal tubes, which are fused to the inner circumferential surface of the external tube, can be generated. At this time, the elastic connecting part 130 is slightly bent (K) to back up the internal tube 120, so that the internal tube 120 can be supported and fixed thereto, thereby the plurality of internal tubes 120 can be stably inserted into and joined by fusing onto the inner circumferential surface of the external tube 110.

Figure 8:
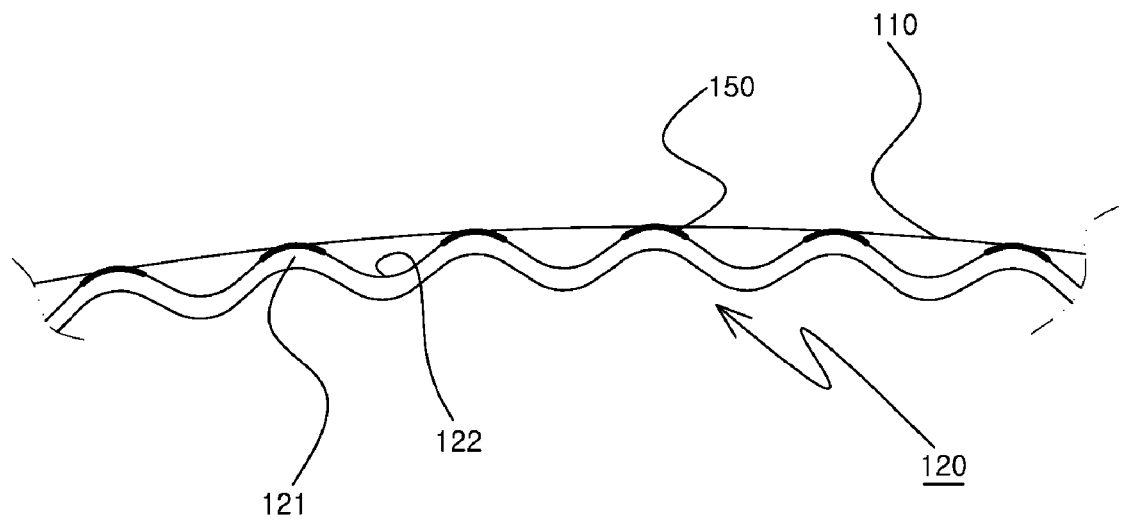
FIG. 8 is an enlarged sectional view illustrating a state of forming a rounding portion and a silicon coating layer on a mountain portion of each internal tube according to the present invention.

Particularly, where the pipe made of the synthetic resin having long optical fibers or electrical wires or the like is installed in a bent state in a curve area of the ground, the internal tubes 120 are elastically supported by the elastic connecting part 130 to be easily bent. Also, as shown in FIG. 8, since each internal tube 120, which is fixed and supported to the elastic connecting part 130, includes the corrugated tube having the mountain portion 121 and the valley portion 122, it is easily bent, thereby it can prevent each internal tube 120 from being deviated from the inner circumferential surface of the external tube 110.

In addition to this, since the elastic connecting part 130 elastically supports each internal tube 120 to the arrow direction of FIG. 4 and FIG. 6, the deformation due to temperature differences between the external tube and the internal tubes during cooling can be prevented while the internal tubes are inserted into and joined by fusing onto the inner circumferential surface of the external tube in a hermetic state.

In the meantime, since the elastic connecting parts 130, which are integrally and radially connected to the lower end of the internal tubes 120 respectively, are more thinly formed than the internal tube 120 in thickness (t), the elastic force can given to the internal tube 120 while it is easily bent.

At this time, when the thickness (t) of the elastic connecting part 130 is less than 0.6 mm, since the thickness of the elastic connecting part 130 is very thin, each internal tube 120 cannot properly supported. Also, when the thickness (t) of the elastic connecting part 130 is over 0.8 mm, since the internal tube is strongly supported by the elastic connecting part 130, the elastic force cannot be properly provided thereto. Accordingly, it is preferred that the thickness (t) of the elastic connecting part 130 is 0.6~0.8 mm.

In addition to this, as shown in FIG. 8, in a state that each internal tube 120, which is accommodated in the external tube 110, includes the corrugated tube having the mountain portion 121 and the valley portion 122, the rounding portion 123 is formed in the mountain portion 121 protruded to each internal tube 120 and the silicon coating layer 150 is formed on the rounding portion 123, so that the contact friction force of the internal tube 120, which is fused to the inner circumferential surface of the external tube 110, can be minimized. Accordingly, when the internal tubes 120 are integrally formed on the external tube 110, it can be easily molded. Also, the internal tube 120 integrally molded and coupled to the inner circumferential surface of the external tube 110 can be easily molded through the silicon coating layer 150, which formed on the rounding portion 123.

INDUSTRIAL APPLICABILITY

According to the pipe made of the synthetic resin having the plurality of internal tubes of the present invention, there are superior effects in that a silicon coating layer is formed on the inner circumference of each synthetic resin internal tube, which are accommodated in the external tube, so that long optical fibers or electrical wires or the like inserted in the internal tube can be readily and easily accommodated therein while water repellency is maintained owing to the silicon coating layer; the elastic connecting part is integrally and radially connected to the lower end of each internal tube from the center part of the external tube, so that each internal tube is easily and elastically inserted into the synthetic resin external tube to be fused thereto; although non-fusion or a deformation of any of the side surfaces of the internal tubes fused to the inner circumferential surface of the external tube can be generated, since it is difficult to equally extrude the plurality of the internal tubes and the elastic connecting part for elastically supporting the internal tubes owing to an injection of the synthetic resin, a cooling process, or their circumstances, the elastic connecting part is slightly bent to back up the internal tube, so that the internal tube can be supported and fixed thereto, thereby the plurality of internal tubes can be stably inserted into and joined by fusing onto the inner circumferential surface of the external tube; and when the internal tubes are elastically supported by the elastic connecting part and the external tube and the internal tubes integrally fused and coupled to the inner circumference surface of the external tube are bent for laying on the curve area of the ground, the internal tubes are elastically supported by the elastic connecting part to be easily bent, each internal tube is closely fused and coupled to the inner circumference surface of the external tube, and a deformation due to temperature differences between the external tube and the internal tubes during cooling can be prevented during cooling.

What is claimed is:

1. A pipe comprising:
   an external tube having a cylindrical shape;
   a plurality of internal tubes, each internal tube having a cylindrical shape and disposed on an inner circumferential surface of the external tube at equal spaces;
   a first silicon coating layer formed on an inner circumference surface of each of the plurality of internal tubes; and
   an elastic connecting part disposed in a center portion of the external tube along a whole length of the external tube and including
      as many supporters as the number of the internal tubes, each of the supporters having a long narrow plate shape and being arranged in a radial manner at equal angles, said each of the supporters having a first side fixed to the outer circumferential surface of corresponding one of the internal tubes along a whole length of the corresponding one of the internal tubes and a second side integrated with second sides of other supporters in a center of the external tube, whereby said each of the supporters elastically supports the corresponding one of the internal tubes, wherein the supporters have the same width from the first side to the second side with each other.

2. A pipe as claimed in claim 1, wherein a thickness (t) of each of the supporters of the elastic connecting part is less than that of said each of the plurality of internal tubes.

3. A pipe as claimed in claim 2, wherein the thickness (t) is 0.6~0.8 mm.

4. A pipe as claimed in claim 1, wherein said each of the plurality of internal tubes has corrugations having a mountain portion and a valley portion.

5. A pipe as claimed in claim 4, wherein a rounding portion is formed in the mountain portion.

6. A pipe as claimed in claim 5, wherein the rounding portion is coated by a second silicon layer, so that the second silicon layer is fused and coupled to the inner circumference surface of the external tube.

* * * * *